No. 841,353. PATENTED JAN. 15, 1907.
G. F. TADINI.
REVERSIBLE VARIABLE SPEED DRIVING GEAR.
APPLICATION FILED FEB. 8, 1906.
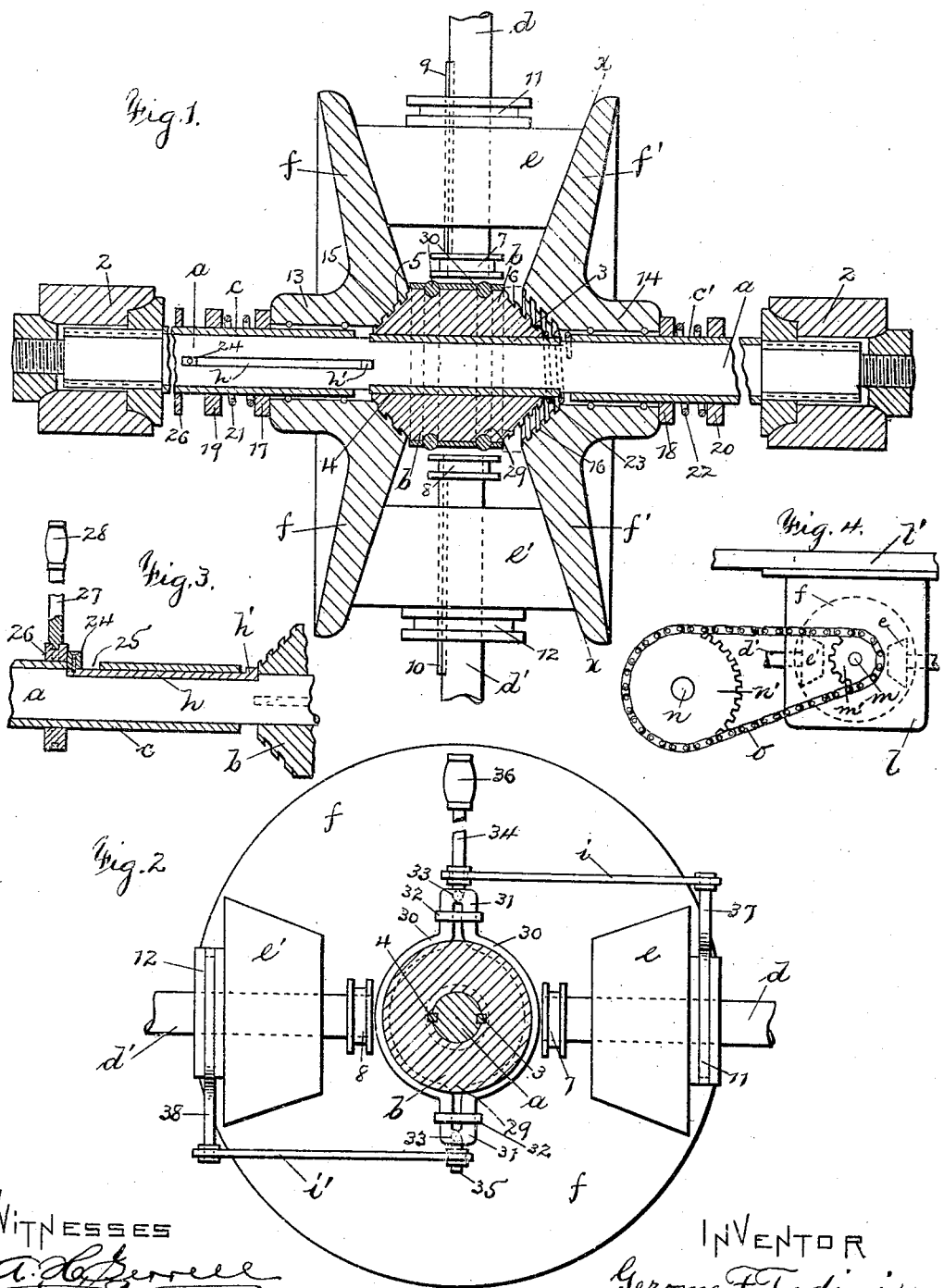

UNITED STATES PATENT OFFICE.

GEROME F. TADINI, OF NEW YORK, N. Y.

REVERSIBLE VARIABLE-SPEED DRIVING-GEAR.

No. 841,353.   Specification of Letters Patent.   Patented Jan. 15, 1907.

Application filed February 8, 1906. Serial No. 300,034.

*To all whom it may concern:*

Be it known that I, GEROME F. TADINI, a citizen of the United States, residing in the borough of Manhattan, city, county, and State of New York, have invented an Improvement in Reversible Variable-Speed Driving-Gears, of which the following is a specification.

My invention relates to a reversible variable-speed drive-gear, is particularly adapted for motor-car use, and in carrying out my invention I employ, together with a driven shaft and the driven members connected thereto, a device slidable on the said driven shaft and revoluble therewith, auxiliary shafts adapted to be turned in opposite directions, drive-pulleys slidably mounted on the said auxiliary shafts, friction-pulleys loosely mounted on the said driven shaft, means for maintaining the friction-pulleys against the drive-pulleys, means for normally causing the said device to engage one of the said friction-pulleys, means for causing the said device to engage the other friction-pulley, and means for shifting the said pulleys to and away from one another to vary the speed at which the driven shaft is turned, all of which will be hereinafter more particularly described.

In the drawings, Figure 1 is a sectional plan illustrating my improved apparatus. Fig. 2 is a sectional elevation on line $x\,x$, Fig. 1. Fig. 3 is a partial section taken at right angles to that shown in Fig. 1 and illustrating the movable bar by which the contact device is shifted on the driven shaft, and Fig. 4 is a diagrammatic view illustrating a modification of my improved device.

In the drawings, $a$ designates a driven shaft whose opposite ends may be constructed to receive the drive-wheels of the motor-vehicle, whose hubs are indicated at 2.

$b$ is a double-cone clutch mounted, preferably, centrally on the driven shaft $a$, slidable thereon, and made to turn therewith by suitable keys or splines 3 4. The opposite ends of the clutch member $b$ are preferably tapered and provided with screw-threads 5 6, respectively.

The driven shaft $a$ is fitted with suitable sleeves $c\,c'$. At right angles to the driven shaft $a$ and with their axes in the same plane therewith I employ auxiliary drive-shafts $d\,d'$, journaled at their adjacent ends in bearings 7 8, respectively, and in close proximity to the surface of the double-ended-cone clutch $b$. On the auxiliary shafts $d\,d'$, respectively, I employ drive-pulleys $e\,e'$, each slidable on its respective shaft and caused to turn therewith by a spline or key 9 10, respectively. The drive-pulleys $e\,e'$ are preferably conical, and secured to each one of these members, respectively, is a collar 11 12, and these collars are also keyed to their respective auxiliary shafts and movable thereon with the said drive-pulleys $e\,e'$.

$f\,f'$ designate friction-pulleys whose hubs 13 14, respectively, are loosely mounted on sleeves $c\,c'$ on the driven shaft $a$, and these friction-pulleys $f\,f'$ are also preferably conical, the inclination of the faces thereof corresponding with the inclination of the faces of the drive-pulleys $e\,e'$. The inner adjacent portions of the hubs 13 14 of the friction-pulleys are correspondingly recessed and similarly provided with screw-threads 15 16, corresponding with and adapted to be engaged, respectively, by the screw-threads 5 6 on the tapering ends of the screw-threaded tapering-ended member $b$.

At the outer ends of the hubs 13 14 of the friction-pulleys $f\,f'$ the sleeves $c\,c'$ are fitted, respectively, with movable collars 17 18, and at an appreciable distance from these movable collars 17 18 the said sleeves $c\,c'$ are provided with collars 19 20, and extending between the said collars 17 19 and 18 20 and surrounding the said sleeves $c\,c'$, respectively, I employ helical or other springs 21 22, whose function, as will be apparent, is to maintain the conical faces of the friction-pulleys $f\,f'$ in contact with the faces of the drive-pulleys $e\,e'$, and surrounding the driven shaft $a$, and extending between the inner end of the sleeve $c'$ and the adjacent end of the double-cone clutch $b$ I employ a spring 23, preferably helical, whose function, as will be apparent, is to maintain the double-cone clutch $b$ in such a position that screw-threads 5 on the left-hand end thereof will engage the screw-threads 16 in the hub of the friction-pulley $f$.

On the left-hand side of the clutch member $b$ I employ a movable bar $h$, let into a suitable longitudinal recess in the driven member $a$, and between the same and the sleeve $c$, one end of the movable bar $h$ is provided with a projection $h'$, adapted to contact with the end of the clutch member $b$. The opposite end of the movable bar $h$ is fitted with a contact-piece 24, extending through suitable slot 25 in the sleeve $c$ and adapted to be engaged by a collar 26, which is loosely fitted on the sleeve c and provided with a rod 27, to which is attached a handle 28, by which, through the movement caused by the movable handle 28, the movable bar h may be actuated to throw the clutch member b out of engagement with the friction-pulley f and into engagement with the friction-pulley f' against the action of the spring 23.

The cylindrical periphery of the clutch member b is provided in suitable positions with circumferential recesses 29, preferably semicircular in cross-section, and within these recesses 29 I may employ bands 30, which at diametrically opposite points are outturned, as indicated at 31, and maintained in this position by means of the spanners 32 or otherwise, and the outwardly-turned portions 31 of the bands 30 are each connected to a bar 33. Arms 34 35 are connected, respectively, to the upper and lower connecting-bars 33, and to the arm 34 a handle 36 is secured.

The collar 11 is provided with a spanner 37 and the collar 12 with a similar spanner 38, and a connecting-rod i is pivotally connected at one end to the spanner 37 and at the opposite end to the bar 34, while the connecting-rod i' is similarly pivotally connected at one end to the spanner 38 and at the opposite end to the arm 35, by which structure it will be manifest that through the forward or backward movement of the handle 36 the pulleys e e' may be moved toward and away from one another to increase or diminish the speed at which the driven shaft is turned.

It will also be understood that I do not limit myself either to the mechanism hereinbefore described for shifting the drive-pulleys e e' or for causing the disengagement of the clutch with one of the friction-pulleys and the engagement of the same with the other friction-pulley, as other and equivalent means may be employed to perform these functions without departing from the nature and spirit of my invention, and, furthermore, it will also be apparent that the reversible variable-speed driving-gear comprising my present invention may be inclosed within a suitable casing l, secured in any desired manner to support l', and the driven shaft m provided with a sprocket m', through which the shaft n, to which the power is to be supplied, is driven by means of the sprocket-wheel n' thereon and the chain o, passing around the aforesaid sprockets, as shown in Fig. 4.

It is to be understood that the pitch and depth of the teeth on the inclined sides of the clutch member b and the hubs of the friction-pulleys f f' are such that the slightest variation in speed of one or the other of these members will cause a sufficient disengagement of the teeth to separate the one member from the other and also that in a state of rest or non-operative condition the teeth on the clutch member b do not engage the teeth on the hub of either friction-pulley in such a manner that the clutch member cannot be readily shifted on the drive-shaft a, such an engagement taking place only when the clutch member b and the drive-shaft a are being driven by either friction-pulley f or f' through the intervention of the drive-pulleys e e' and the auxiliary drive-shafts d d'. Now in the operation of the apparatus the auxiliary drive-shafts d d' are turned in opposite directions by any suitable source of power, whereby the friction-pulleys f f' are also caused to turn in opposite directions on their respective bearings on the drive-shaft a.

Assuming that the parts as shown are in the position for driving the vehicle forward, the friction-pulley f engages the clutch member b, and through the same the power is transmitted to the drive-shaft a and vehicle-wheels.

To increase or decrease the speed, as will be apparent, the drive-pulleys e may be moved toward or away from one another by means of the handle 36 on the lever 34 and associated parts, and to reverse the mechanism it is only necessary to cause the clutch member b and friction-pulley f to turn at a different rate of speed, which manifestly may be done in a number of ways—for instance, by reducing the power or reducing the speed at which the friction-pulley f is turning by separating the drive-pulleys e e'—whereupon through the levers 27 and 28 and the bar h the clutch member b may be shifted on the drive-shaft a to cause the same to engage with the friction-pulley f', which turning in the opposite direction will necessarily reverse the direction of rotation of the drive-shaft a. Manifestly the clutch member b may be freed in a similar manner from the friction-pulley f', whereupon it will be automatically shifted on the drive-shaft a by means of a spring 23.

I claim as my invention—

1. In a reversible variable-speed drive-gear, a driven shaft, a device slidably mounted thereon and revoluble therewith, members loosely mounted on said shaft on both sides of the said device, means for turning said members on the shaft and means for causing the said device to normally engage one of the said members.

2. In a reversible variable-speed drive-gear, a driven shaft, a device slidably mounted thereon and revoluble therewith, members loosely mounted on said shaft on both sides of the said device, means for turning said members on the shaft, means for causing the said device to normally engage one of the said members and means for causing the said device to engage the other of the said members.

3. In a reversible variable-speed drive-gear, a driven shaft, a device slidably mounted thereon and revoluble therewith, members loosely mounted on said shaft on both sides of said device, means for turning said members on the said shaft, means for shifting the aforesaid means for varying the speed at which the said driven shaft is turned and means for causing the said device to normally engage one of the said members.

4. In a reversible variable-speed drive-gear, a driven shaft, a device slidably mounted thereon and revoluble therewith, members loosely mounted on said shaft on both sides of said device, means for turning said members on the said shaft, means for shifting the aforesaid means for varying the speed at which the said driven shaft is turned, means for causing the said device to normally engage one of the said members and means for causing the said device to engage the other of the said members.

5. In a reversible variable-speed drive-gear, a driven shaft, a device slidably mounted on the said shaft and revoluble therewith, members loosely mounted on said shaft on both sides of the said device, auxiliary shafts, drive-pulleys slidably mounted thereon, means for maintaining the said members in contact with the said drive-pulleys and means for maintaining the said device in contact normally with one of the said members.

6. In a reversible variable-speed drive-gear, a driven shaft, a device slidably mounted on the said shaft and revoluble therewith, members loosely mounted on said shaft on both sides of the said device, auxiliary shafts, drive-pulleys slidably mounted thereon, means for maintaining the said members in contact with the said drive-pulleys, means for maintaining the said device in contact normally with one of the said members and means for causing the said device to engage the other of the said members.

7. In a reversible variable-speed drive-gear, a driven shaft, a device slidably mounted thereon and revoluble therewith, members loosely mounted on the said shaft on both sides of the said device, auxiliary shafts, drive-pulleys slidably mounted thereon, means for shifting the said drive-pulleys on the said auxiliary shafts, means for maintaining the said members in contact with the said drive-pulleys and means for maintaining the said device in contact normally with one of the said members.

8. In a reversible variable-speed drive-gear, a driven shaft, a device slidably mounted thereon and revoluble therewith, members loosely mounted on the said shaft on both sides of the said device, auxiliary shafts, drive-pulleys slidably mounted thereon, means for shifting the said drive-pulleys on the said auxiliary shafts, means for maintaining the said members in contact with the said drive-pulleys, means for maintaining the said device in contact normally with one of the said members and means for causing the said device to engage the other of the said members.

9. In a reversible variable-speed drive-gear, a driven shaft, driven members connected therewith, a device slidably mounted on the said driven shaft and revoluble therewith, members loosely mounted on the said shaft on both sides of the said device, means for turning the said members on the shaft and means for causing the said device to normally engage one of the said members.

10. In a reversible variable-speed drive-gear, a driven shaft, driven members connected therewith, a device slidably mounted on the said driven shaft and revoluble therewith, members loosely mounted on the said shaft on both sides of the said device, means for turning the last aforesaid members on the shaft, means for causing the said device to normally engage one of the said members and means for causing said device to engage the other of the said members.

11. In a reversible variable-speed drive-gear, a driven shaft, a device slidably mounted on the said shaft and revoluble therewith, friction-pulleys mounted loosely on the said driven shaft on both sides of said device, auxiliary shafts, drive-pulleys slidably mounted on said auxiliary shafts, springs for maintaining the said friction-pulleys in contact with the said drive-pulleys and means for maintaining the said device in contact normally with one of the said friction-pulleys.

12. In a reversible variable-speed drive-gear, a driven shaft, a device slidably mounted on the said shaft and revoluble therewith, drive-pulleys mounted loosely on the said driven shaft on both sides of said device, auxiliary shafts, drive-pulleys slidably mounted on said auxiliary shafts, springs for maintaining the said friction-pulleys in contact with the said drive-pulleys, a spring for normally maintaining the said device in contact with one of the said friction-pulleys and means for sliding the said device to cause the same to engage the other friction-pulley.

13. In a reversible variable-speed drive-gear, a driven shaft, a device slidably mounted on the said shaft and revoluble therewith, friction-pulleys loosely mounted on the said shaft on both sides of the said device, auxiliary shafts, drive-pulleys slidably mounted thereon, means for maintaining the said friction-pulleys in contact with the said drive-pulleys, means for normally maintaining the said device in contact with one of the said friction-pulleys and means for shifting the said drive-pulleys on the auxiliary shafts for varying the speed at which the driven shaft is turned.

14. In a reversible variable-speed drive-gear, a driven shaft, a device slidably mounted on the said driven shaft and revoluble therewith, friction-pulleys loosely mounted on the said shaft on both sides of the said device, auxiliary shafts, drive-pulleys slidably mounted thereon, means for maintaining the said friction-pulleys in contact with the drive-pulleys, a spring for normally maintaining the said device in contact with one of the said friction-pulleys, a movable bar set longitudinally into the surface of the said driven shaft and bearing at one end against a side of the said slidable device and an arm and handle connected to the opposite end of the said movable bar for actuating the same to cause the said slidable device to engage the opposite friction-pulley.

15. In a reversible variable-speed drive-gear, a driven shaft, a device slidably mounted on the said driven shaft and revoluble therewith, friction-pulleys loosely mounted on the said shaft on both sides of the said device, auxiliary shafts, drive-pulleys slidably mounted thereon, means for maintaining the said friction-pulleys in contact with the drive-pulleys, a spring for normally maintaining the said device in contact with one of the said friction-pulleys, a movable bar set longitudinally into the surface of the said driven shaft and bearing at one end against a side of the said slidable device, an arm and handle connected to the opposite end of the said movable bar for actuating the same to cause the said slidable device to engage the opposite friction-pulley, bands surrounding the said slidable device, connecting-rods connected to the said bands at diametrically opposite points and extending between the same respectively and the drive-pulleys, and an arm and a handle connected to the said bands surrounding the slidable device through the operation of which the said drive-pulleys may be shifted to vary the speed at which the driven shaft is turned.

16. In a reversible variable-speed drive-gear, a driven shaft, a double-cone clutch slidably mounted thereon and revoluble therewith and whose opposite ends are screw-threaded, friction-pulleys mounted loosely on both sides of the said clutch, auxiliary shafts, drive-pulleys slidably mounted on the said auxiliary shafts, springs for maintaining the said friction-pulleys in contact with the said drive-pulleys and means for maintaining the said cone-clutch in contact normally with one of the said friction-pulleys.

17. In a reversible variable-speed drive-gear, a driven shaft, a cone-clutch slidably mounted thereon and revoluble therewith and provided on its opposite ends with screw-threads, drive-pulleys mounted loosely on the said driven shaft on both sides of the said cone-clutch and provided in their inner hub portions with screw-threaded recesses adapted to receive and be engaged by the said screw-threaded ends of the cone-clutch, auxiliary shafts, drive-pulleys slidably mounted on the said auxiliary shafts, springs for maintaining the said friction-pulleys in contact with the drive-pulleys, a spring for normally maintaining one end of the cone-clutch in engagement with the screw-threaded recess in one of the said friction-pulleys and means for sliding the said cone-clutch to cause the opposite end of the same to engage the screw-threaded recess in the other friction-pulley.

18. In a reversible variable-speed drive-gear, a driven shaft, a cone-clutch slidably mounted thereon and revoluble therewith and provided on its opposite ends with screw-threads, friction-pulleys loosely mounted on said driven shaft on both sides of the said cone-clutch and whose inner hub portions are provided with conical screw-threaded recesses adapted to receive and engage the screw-threaded ends of the cone-clutch, auxiliary shafts, drive-pulleys slidably mounted thereon, means for maintaining the said friction-pulleys in contact with the drive-pulleys, means for normally maintaining one screw-threaded end of the said cone-clutch in engagement with the screw-threaded recesses in one of the said friction-pulleys, means for sliding the said cone-clutch to cause the opposite screw-threaded end to be engaged by the screw-threaded recess in the other friction-pulley and means for shifting the said drive-pulleys on the auxiliary shafts for varying the speed at which the driven shaft is turned.

19. In a reversible variable-speed drive-gear, a driven shaft, a cone-clutch slidably mounted thereon and revoluble therewith and provided at its opposite ends with screw-threads, friction-pulleys loosely mounted on the driven shaft on both sides of the cone-clutch, auxiliary shafts at right angles to the said driven shaft, drive-pulleys slidably mounted on the auxiliary shafts, means for maintaining the said friction-pulleys in contact with the drive-pulleys, a spring for normally maintaining the said cone-clutch in contact with one of the said friction-pulleys, a movable bar set longitudinally into the surface of the said driven shaft and bearing at one end against one side of the said cone-clutch, and an arm and a handle secured thereto connected to the opposite end of the said movable bar for actuating the same to cause the said cone-clutch to engage the opposite friction-pulley.

20. In a reversible variable-speed drive-gear, a driven shaft, a cone-clutch slidably mounted thereon, revoluble therewith and provided on its opposite ends with screw-threads, friction-pulleys loosely mounted on the said driven shaft on both sides of the said cone-clutch and whose inner hub portions are provided with conical screw-threaded recesses adapted to receive and engage the screw-threaded ends of the cone-clutch, auxiliary shafts at right angles to the said driven shaft, drive-pulleys slidably mounted on the auxiliary shafts, means for maintaining the said friction-pulleys in contact with the drive-pulleys, a spring for normally maintaining one screw-threaded end of the said cone-clutch in contact with the screw-threaded recess in one of the said friction-pulleys, a movable bar set longitudinally into the surface of the said driven shaft and bearing at one end against the end of the said cone-clutch, an arm and a handle connected to the opposite end of said movable bar for actuating the same to cause the screw-threads on the opposite end of the cone-clutch to come into engagement with the screw-threaded recess in the other friction-pulley, bands surrounding the said cone-clutch, bands connected to the said drive-pulleys, connecting-rods extending between the said bands surrounding the cone-clutch and the bands connected with the said drive-pulleys, and an arm and a handle connected to the said bands surrounding the clutch, through the operation of which, the said drive-pulleys may be shifted to vary the speed at which the driven shaft is turned.

Signed by me this 25th day of January, 1906.

GEROME F. TADINI.

Witnesses:
GEO. T. PINCKNEY,
E. ZACHARIASEN.